US011261638B2

(12) United States Patent
Song et al.

(10) Patent No.: US 11,261,638 B2
(45) Date of Patent: Mar. 1, 2022

(54) HINGE ASSEMBLY FOR TRUNK LID OF VEHICLE

(71) Applicant: GUMCHANG. CO., LTD., Yeongcheon-si (KR)

(72) Inventors: Jae-Yel Song, Daegu (KR); Hai-Tai Choi, Gyeongsan-si (KR); Sae-Gil Shin, Daegu (KR); Sang-Ho Lee, Daegu (KR); Yong-Hyeon Joo, Daegu (KR)

(73) Assignee: GUMCHANG. CO., LTD., Yeongcheon-si (KR)

( * ) Notice: Subject to any disclaimer, the term of this patent is extended or adjusted under 35 U.S.C. 154(b) by 0 days.

(21) Appl. No.: 17/148,131

(22) Filed: Jan. 13, 2021

(65) Prior Publication Data
US 2021/0246702 A1  Aug. 12, 2021

(30) Foreign Application Priority Data

Feb. 7, 2020  (KR) ........................ 10-2020-0014784

(51) Int. Cl.
*E05F 1/08*  (2006.01)
*E05F 3/20*  (2006.01)
(Continued)

(52) U.S. Cl.
CPC ................ *E05F 3/20* (2013.01); *B62D 25/12* (2013.01); *E05D 3/02* (2013.01); *E05D 5/062* (2013.01);
(Continued)

(58) Field of Classification Search
CPC ....... E05D 11/04; E05D 11/045; E05D 11/06; E05D 11/1085; E05D 11/1007;
(Continued)

(56) References Cited

U.S. PATENT DOCUMENTS 2,479,437 A * 8/1949 Vigmostad ............ E05F 1/1276
16/289
4,580,315 A * 4/1986 Beckwith .............. E05F 1/1238
16/289

(Continued)

FOREIGN PATENT DOCUMENTS

KR  10-2019-0066800 A  6/2019

OTHER PUBLICATIONS

Office Action issued in KR 10-2020-0014784; mailed by the Korean Intellectual Property Office dated Apr. 7, 2020.
(Continued)

*Primary Examiner* — Chuck Y Mah
(74) *Attorney, Agent, or Firm* — Studebaker & Brackett PC

(57) ABSTRACT

Disclosed is a hinge assembly for rotatably mounting a trunk lid to a vehicle body. The hinge assembly for a trunk lid of a vehicle, includes a hinge arm configured to be coupled to the trunk lid, a hinge bracket configured to be coupled to a vehicle body and having a hinge shaft, the hinge arm being rotatably coupled to the hinge bracket, a torsion bar configured to be coupled to the hinge arm and to provide an elastic force to the hinge arm in an opening direction, and a cushion assembly provided at one end of the hinge arm adjacent to the hinge shaft and configured to adjust a rotation speed of the hinge arm in response to the elastic force of the torsion bar.

3 Claims, 8 Drawing Sheets

(51) Int. Cl.
   *B62D 25/12* (2006.01)
   *E05D 3/02* (2006.01)
   *E05D 5/06* (2006.01)
   *E05F 3/18* (2006.01)

(52) U.S. Cl.
   CPC .......... *E05F 3/18* (2013.01); *E05D 2005/067* (2013.01); *E05Y 2201/408* (2013.01); *E05Y 2201/422* (2013.01); *E05Y 2201/474* (2013.01); *E05Y 2201/484* (2013.01); *E05Y 2900/548* (2013.01)

(58) Field of Classification Search
   CPC ... E05D 2005/067; E05D 5/062; E05D 3/127; E05D 3/145; E05D 3/18; E05D 3/12; E05Y 2900/502; E05Y 2900/50; E05Y 2900/548; E05Y 2900/536; E05Y 2900/546; E05Y 2900/531; E05Y 2201/416; E05F 1/123; E05F 1/1238; E05F 1/1033; E05F 1/1276; E05F 1/1284; E05F 5/022; Y10T 16/5402; Y10T 16/54024; Y10T 16/540247; Y10T 16/54026; Y10T 16/54048; Y10T 16/5409; Y10T 16/53885; Y10T 16/5389; Y10T 16/53834; Y10T 16/5385
   See application file for complete search history.

(56) References Cited

U.S. PATENT DOCUMENTS

| | | | | |
|---|---|---|---|---|
| 5,195,796 | A * | 3/1993 | Wampler, II | E05D 3/18 16/358 |
| 5,235,725 | A * | 8/1993 | Rees | E05F 1/1207 16/298 |
| 5,419,012 | A * | 5/1995 | Lewis | E05D 3/10 16/306 |
| 6,568,033 | B2 * | 5/2003 | Kim | E05F 1/1033 16/334 |
| 8,240,006 | B2 * | 8/2012 | Lee | E05D 5/062 16/297 |
| 9,222,296 | B2 * | 12/2015 | Hamminga | E05F 15/41 |
| 9,279,279 | B1 * | 3/2016 | Kim | B60J 5/101 |
| 10,487,556 | B2 * | 11/2019 | Hyun | E05F 5/022 |
| 2006/0230578 | A1 * | 10/2006 | Renke | E05F 1/1276 16/289 |
| 2008/0098567 | A1 * | 5/2008 | Duffy | E05F 1/1016 16/306 |
| 2009/0194348 | A1 | 8/2009 | Faubert | |
| 2010/0251519 | A1 * | 10/2010 | Duffy | E05F 1/1215 16/304 |
| 2013/0318745 | A1 * | 12/2013 | Krajenke | E05F 1/1284 16/305 |

OTHER PUBLICATIONS

Notice of Allowance issued in KR 10-2020-0014784; mailed by the Korean Intellectual Property Office dated Jun. 1, 2020.

* cited by examiner

HINGE ASSEMBLY FOR TRUNK LID OF VEHICLE

CROSS-REFERENCE TO RELATED APPLICATION

This application claims priority from Korean Patent Application No. 10-2020-0014784 filed on Feb. 7, 2020 in the Korean Intellectual Property Office, and all the benefits accruing therefrom under 35 U.S.C 119, the contents of which in its entirety are herein incorporated by reference.

BACKGROUND

1. Technical Field

The present inventive concept relates to a hinge assembly for rotatably mounting a trunk lid to a vehicle body.

This work was supported by Regional Specialized Industry Development Program+(R&D) grant funded by Ministry of Small and Medium-sized Enterprises (SMEs) and Startups (MSS), Korea Institute for Advancement of Technology (KIAT) (No. S2937083, "Development of a full-open trunk lid hinge with friction reduction (noise reduction) structure and high productivity damping spring assembly system", 2020 Jun. 1~2021 May 31)

2. Description of the Related Art

In general, the trunk of a vehicle can be opened and closed by a trunk lid. A trunk lid is mounted to a vehicle body in a hinged structure to thereby open and close the trunk according to the rotational movement. Here, the opening and closing or rotational movement of the trunk lid may be assisted by some elastic means. This is to assist the user's operating force and to prevent the trunk lid from rotating rapidly. Conventionally, in a general case, such opening and closing or rotational movement was assisted by a coil spring and a gas lift. However, the conventional method of using a gas lift resulted in relatively high manufacturing costs, and a limitation on weight reduction because a large number of parts were required. Accordingly, a method of using a torsion bar or the like has been newly developed.

SUMMARY

Embodiments of the present inventive concept are intended to provide a hinge assembly for a trunk lid of a vehicle capable of assisting in an opening and closing operation using a torsion bar.

Further, embodiments of the present inventive concept are intended to provide a hinge assembly for a trunk lid of a vehicle that can be implemented at a lower cost and can be light-weighted.

Moreover, embodiments of the present inventive concept are intended to provide a hinge assembly for a trunk lid of a vehicle that has a smoother feeling of operation and is capable of improving the convenience of use or safety.

According to one aspect of the present inventive concept, there may be provided a hinge assembly for a trunk lid of a vehicle including a hinge arm configured to be coupled to the trunk lid, a hinge bracket configured to be coupled to a vehicle body and having a hinge shaft, the hinge arm being rotatably coupled to the hinge bracket, a torsion bar configured to be coupled to the hinge arm and to provide an elastic force to the hinge arm in an opening direction, and a cushion assembly provided at one end of the hinge arm adjacent to the hinge shaft and configured to adjust a rotation speed of the hinge arm in response to the elastic force of the torsion bar, wherein the cushion assembly includes a pin holder provided with a guide groove at an upper end thereof and arranged to be movable vertically inside the hinge arm, a roller assembly spaced downward from the guide groove by a predetermined distance and configured to be coupled to the pin holder, a spring holder arranged spaced downward from the pin holder by a predetermined distance and configured to be fixedly installed inside the hinge arm, and a damping spring configured to elastically support between the pin holder and the spring holder.

The hinge assembly in accordance with the embodiments of the present inventive concept can assist in the opening and closing operation of the trunk lid by the method of using the torsion bar or the like. In particular, this can be implemented at a significantly lower cost compared to the conventional method of using a gas lift or the like, and can also have the effect of weight reduction by omitting parts.

In addition, the hinge assembly in accordance with the embodiments of the present inventive concept can realize a smooth and stable feeling of operation through the guide profile, the cushion assembly, or the like, despite the cost reduction or weight reduction as described above. As a result, a safety incident resulting from the rapid opening of a trunk lid, a problem of decreased emotional quality, or the like can be effectively resolved.

DETAILED DESCRIPTION OF EMBODIMENTS

Hereinafter, embodiments of the present inventive concept will be described with reference to the accompanying drawings. However, it should be noted that the following embodiments are provided to help understand the present inventive concept, and the scope of the present inventive concept is not limited to the embodiments below. The following embodiments are provided to more completely describe the present inventive concept to those having ordinary knowledge in the art to which the present inventive concept pertains, and detailed descriptions will be omitted for known configurations that are determined to unnecessarily obscure the technical subject matter of the present inventive concept.

Figure 1:
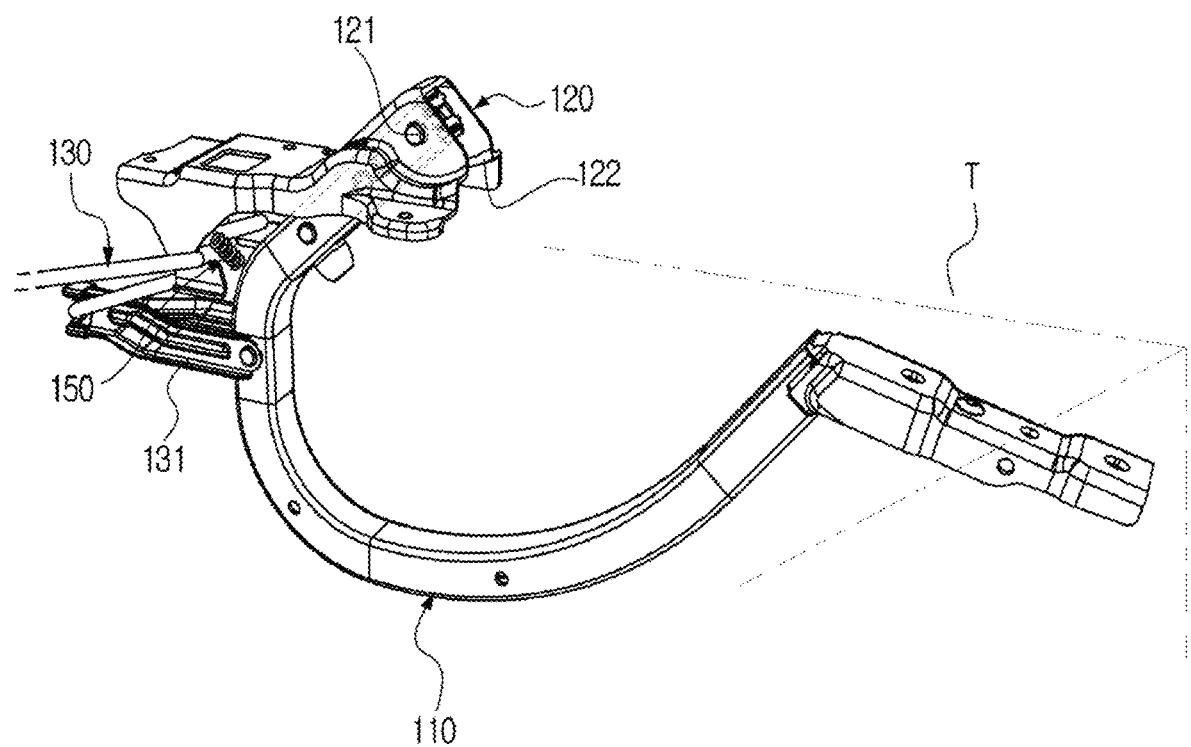
FIG. 1 is a schematic view showing a hinge assembly for a trunk lid of a vehicle in accordance with one embodiment of the present inventive concept.

FIG. 1 is a schematic view showing a hinge assembly for a trunk lid of a vehicle in accordance with one embodiment of the present inventive concept.

Referring to FIG. 1, the hinge assembly 100 of the present embodiment may include a hinge arm 110.

The hinge arm 110 may have one end (the left end in the drawing) rotatably coupled to a hinge bracket 120. Alternatively, the hinge arm 110 may have the one end coupled to the hinge bracket 120 via a hinge shaft 121. Accordingly, the hinge arm 110 may rotate with respect to the hinge bracket 120 about the hinge shaft 121.

Meanwhile, a cushion assembly 140 or the like may be installed inside the one end of the hinge arm 110 to be coupled to the hinge bracket 120. This will be described later with reference to FIG. 2 and so on.

The other end (the right end in the drawing) of the hinge arm 110 may be coupled to a trunk lid T. The other end of the hinge arm 110 may be firmly fixedly installed in the trunk lid T, and accordingly, the trunk lid T may be rotated around the hinge shaft 121 together with the hinge arm 110. The rotation of the trunk lid T means the opening and closing of the trunk.

The hinge arm 110 may have a bar shape that extends curvedly in a predetermined form. However, the curved shape of the hinge arm 110 is not necessarily limited to the shape illustrated in FIG. 1 and so on, and may be variously modified as necessary.

One hinge assembly 100 may be provided with a plurality of hinge arms 110. In general, the hinge arms 110 may be provided in a pair, spaced apart to the left and right. However, the number of hinge arms 110 may be increased or decreased as necessary, but is not necessarily limited thereto.

Meanwhile, hinge brackets 120 and so on to be described below may be provided in plurality so as to correspond to the plurality of hinge arms 110. For example, if a pair of left and right hinge arms 110 are provided, the hinge brackets 120 and so on may be provided in a pair of left and right ones. However, since the plurality of hinge brackets 120 and so on may be formed identically or similarly, respectively, the description will be made based on one hinge bracket 120 and so on in the following.

Meanwhile, the hinge assembly 100 of the present embodiment may include a hinge bracket 120.

The hinge bracket 120 may be coupled to one end of the hinge arm 110 via the hinge shaft 121. Further, the hinge bracket 120 may be fixedly installed on one side of the vehicle body. Therefore, the hinge arm 110 and the trunk lid T may be supported by the hinge bracket 120 and may rotate around the hinge shaft 121 according to the opening and closing operation. For reference, FIG. 1 shows a state in which the trunk lid T is closed.

The hinge bracket 120 may have a guide profile 122. The guide profile 122 may be formed to extend a predetermined length along the rotational direction about the hinge shaft 121 and may generally have a circular-arc shape having a predetermined curvature. However, the guide profile 122 may have one or more curvatures, and does not necessarily have to be extended at a constant curvature.

The guide profile 122 may make contact or interact with the cushion assembly 140 to be described later, to thereby assist in the opening and closing operation of the trunk lid T. This will be further described with reference to FIG. 2 and so on.

Meanwhile, the hinge assembly 100 of the present embodiment may include a torsion bar 130.

The torsion bar 130 may elastically support the hinge arm 110 and the trunk lid T. Thereby, the hinge arm 110 and the trunk lid T may be elastically supported in the opening direction. In other words, when an external force is removed, the hinge arm 110 and the trunk lid T may be rotated in the opening direction by the elastic force of the torsion bar 130. For reference, according to the illustration, the rotation in the opening direction refers to a counterclockwise rotation about the hinge shaft 121.

The torsion bar 130 may have one side mounted to and supported by the hinge bracket 120, and the other side connected to the hinge arm 110 via a link 131. Alternatively, the torsion bar 130 may be mounted to the hinge bracket 120, to thereby elastically support the hinge arm 110 via the link 131.

As described above, the hinge assembly 100 may be opened and closed by the rotation of the hinge arm 110 and the trunk lid T about the hinge bracket 120 installed in the vehicle body. In this process, the torsion bar 130 may be operated to elastically support the hinge arm 110 in the opening direction (in the counterclockwise direction in the drawing), to thereby assist in the opening and closing operation.

Figure 2:
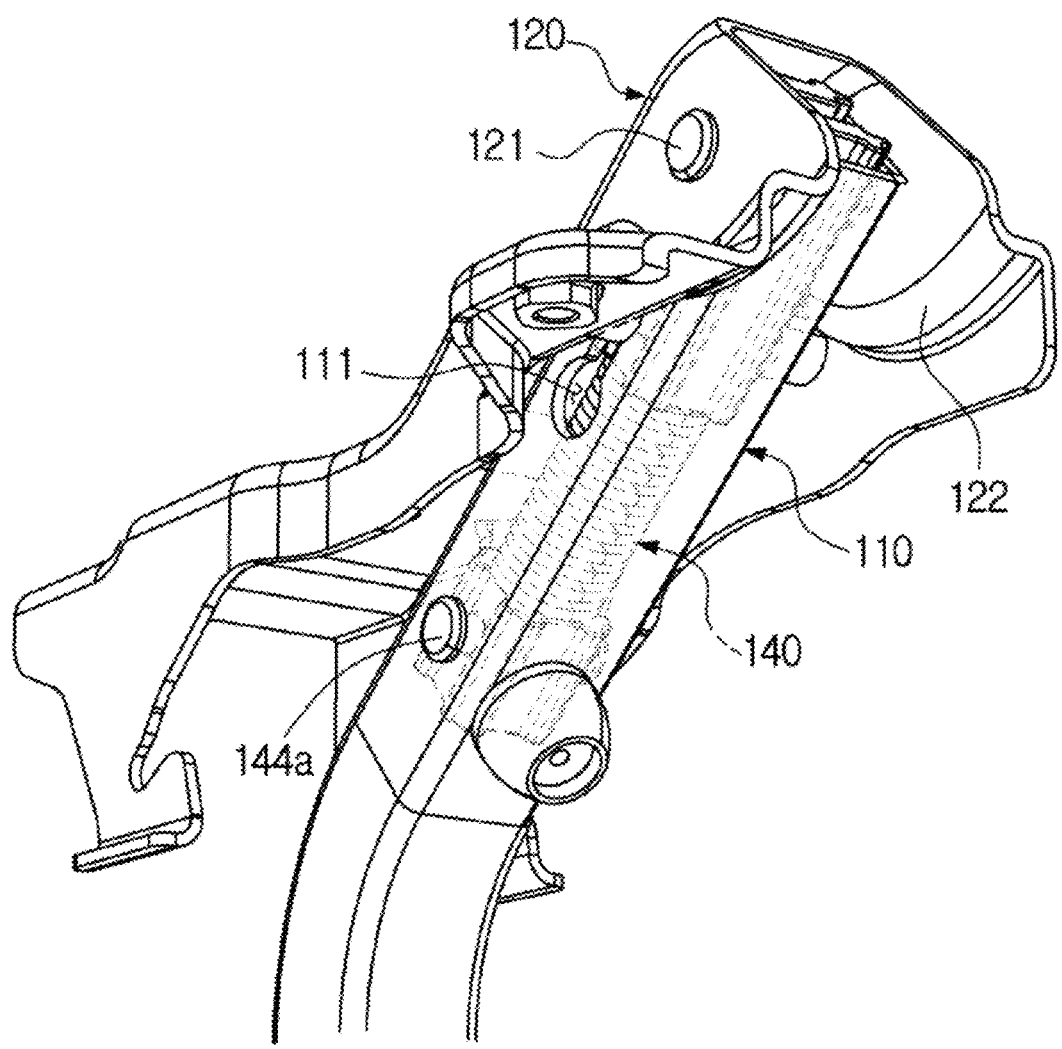
FIG. 2 is an enlarged schematic view showing a hinge bracket portion in the hinge assembly shown in FIG. 1.
Figure 3:
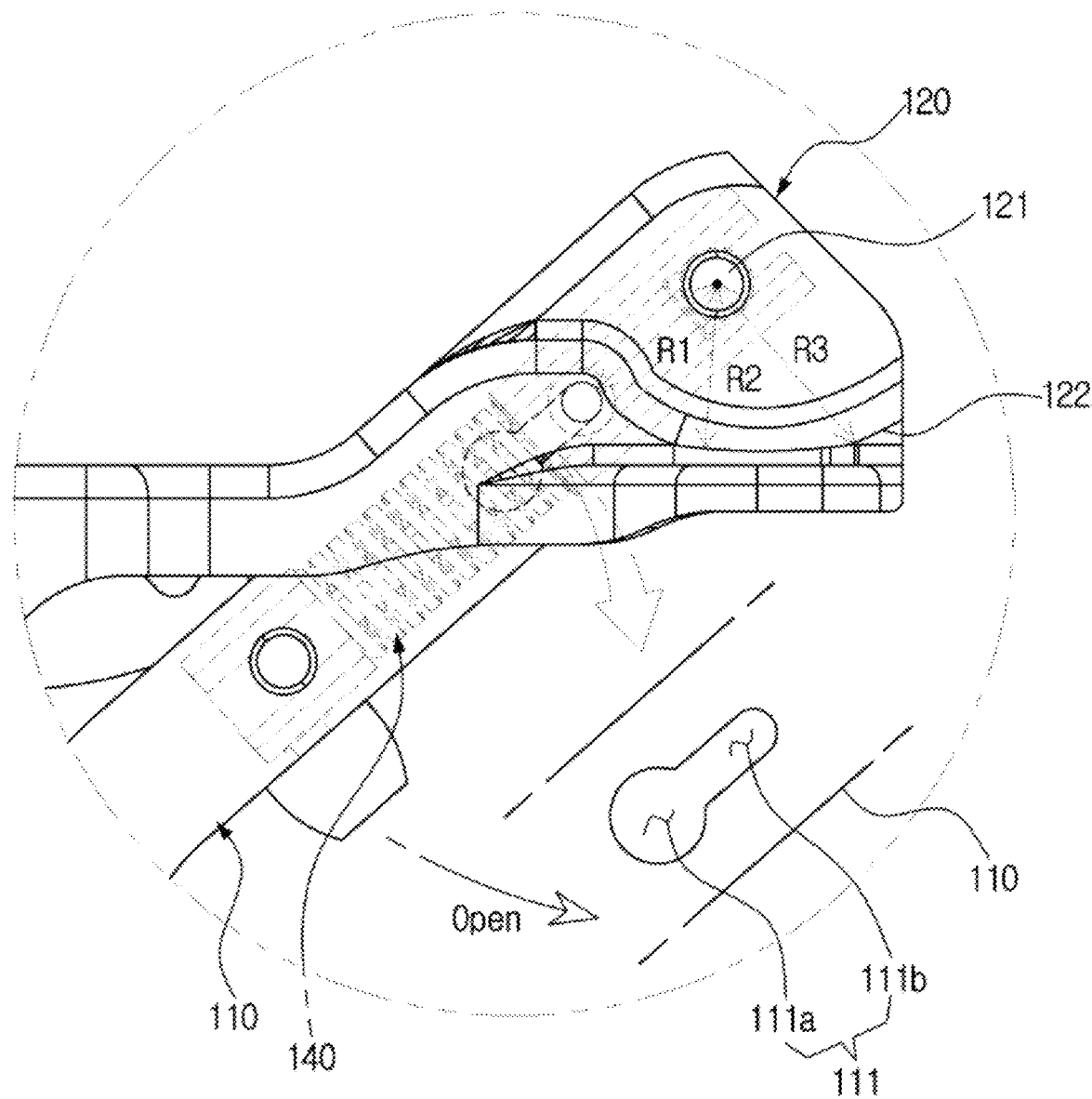
FIG. 3 is a schematic side view of the hinge bracket shown in FIG. 2.

FIG. 2 is an enlarged schematic view showing a hinge bracket portion in the hinge assembly shown in FIG. 1. FIG. 3 is a schematic side view of the hinge bracket shown in FIG. 2.

Referring to FIGS. 2 and 3, the hinge bracket 120 may be provided with a guide profile 122 intended for elastic contact with the cushion assembly 140.

The guide profile 122 may generally be formed to extend along a circular-arc locus centered on the hinge shaft 121, on the lower surface of the hinge bracket 120. The guide profile 122 may be formed to extend appropriately according to the range of the opening and closing operation of the trunk lid T.

The guide profile 122 may be formed to extend generally in a curved shape of circular-arc. Here, the guide profile 122 may be formed to have different radii R1 to R3 depending on the rotation angle about the hinge shaft 121. The radii R1 to R3 may refer to a distance between the hinge shaft 121 and the guide profile 122.

Specifically, the guide profile 122 may have first to third radius, R1 to R3. Here, the first radius R1 may refer to the distance to the hinge shaft 121 at the initial position, the third radius R3 may refer to the distance to the hinge shaft 121 at the final position, and the second radius R2 may refer to the distance to the hinge shaft 121 at an arbitrary position (hereinafter, referred to as an intermediate position) between the initial position and the final position.

In the above, the initial position refers to a position corresponding to the cushion assembly 140 in a state where the trunk lid T is closed, and the final position refers to a position of elastically contacting the cushion assembly 140 in a state where the trunk lid T is completely opened.

Depending on the opening of the trunk lid T, the cushion assembly 140 may make elastic contact with the initial position (closed position), the intermediate position (the position while being opened), and the final position (opened position) of the guide profile 122, and may assist in the opening operation of the trunk lid T. The reverse case is also similar to this.

In the above, the guide profile 122 of the present embodiment may be formed such that the third radius R3 is somewhat larger than the first radius R1. Furthermore, the second radius R2 may be formed to be somewhat larger than the first radius R1 and somewhat smaller than the third radius R3.

In other words, the guide profile 122 may be formed such that the distance to the hinge shaft 121 gradually increases as the opened position is reached. Alternatively, the guide profile 122 may be formed such that the distance to the hinge shaft 121 at the closed position (i.e., the first radius R1) is somewhat larger than the distance to the hinge shaft 121 at the opened position (i.e., the third radius R3).

The configuration of the guide profile 122 as described above allows the trunk lid T to be opened with a smoother feeling of operation. In other words, due to the shape of the guide profile 122 having the first to third radius R1 to R3, the rotation of the hinge bracket 120 T is somewhat regulated or relaxed in the vicinity of the opened position of the trunk lid T, and thus, the trunk lid T may be opened to the final open position with a smooth movement despite the elasticity of the torsion bar 130.

Meanwhile, in the present embodiment, the guide profile 122 may be formed on the lower surface of the hinge bracket 120, and accordingly, may substantially be of a form of being arranged inside the hinge bracket 120. Such a guide profile 122 may be protected from external foreign matter such as dust, and may also contribute to reducing operating noise that could be perceived from outside.

More preferably, the guide profile 122 may be formed to extend with a predetermined width so as to make surface contact with the roller 141b of the cushion assembly 140 to be described later. This may increase the contact area with the roller 141b to realize a smoother and more natural feeling of operation, while also contributing to reducing operating noise.

Meanwhile, the hinge assembly 100 of the present embodiment may include a cushion assembly 140.

The cushion assembly 140 will make elastic contact with the guide profile 122 as described above, to thereby assist in the opening and closing operation of the trunk lid T.

The cushion assembly 140 may be mounted to one end of the hinge arm 110 adjacent to the hinge shaft 121, and may be intended to be generally arranged within the hinge arm 110. Accordingly, the hinge arm 110 may be formed in a hollow structure or in the form having a predetermined space formed therein, at least at the one end portion where the cushion assembly 140 is intended to be arranged.

The cushion assembly 140 may have a roller assembly 141 at the upper end thereof, as will be described later. The roller assembly 141 may be elastically contacted and supported by the guide profile 122, to thereby assist in the opening and closing operation of the trunk lid T. Therefore, the roller assembly 141 may be arranged such that at least a portion thereof (that is, the roller 141b) is exposed to the outside of the hinge arm 110.

For the arrangement and assembly of the roller assembly 141 as described above, the hinge arm 110 may be provided with a pin guide hole 111. The pin guide hole 111 may be formed at an end of the hinge arm 110 adjacent to the hinge shaft 121 so as to penetrate inside and outside the hinge arm 110. Further, the pin guide hole 111 may be formed to penetrate the hinge arm 110 to the left and right, and accordingly, the roller assembly 141 may be exposed at the left and right ends (i.e., rollers 141b) to the outside of the hinge arm 110, to thereby make elastic contact with the guide profile 122.

The pin guide hole 111 may have an insertion hole 111a at the bottom and a moving hole 111b extended from the insertion hole 111a.

The insertion hole 111a may be formed to have a somewhat larger radius or width compared to the moving hole 111b. Preferably, the insertion hole 111a may be formed to have a radius somewhat larger than the radius of the roller assembly 141 to allow insertion of the roller assembly 141. In this case, the roller assembly 141 may be assembled and installed in the hinge arm 110 via the insertion hole 111a.

The moving hole 111b may be formed to extend a predetermined length from one side of the insertion hole 111a. The moving hole 111b may generally have a narrower width compared to the insertion hole 111a, which prevents the assembled roller assembly 141 from being separated. Furthermore, the moving hole 111b may have a form of a slit extending in the longitudinal direction, taking into account the moving range of the roller assembly 141 corresponding to the guide profile 122.

Figure 4:
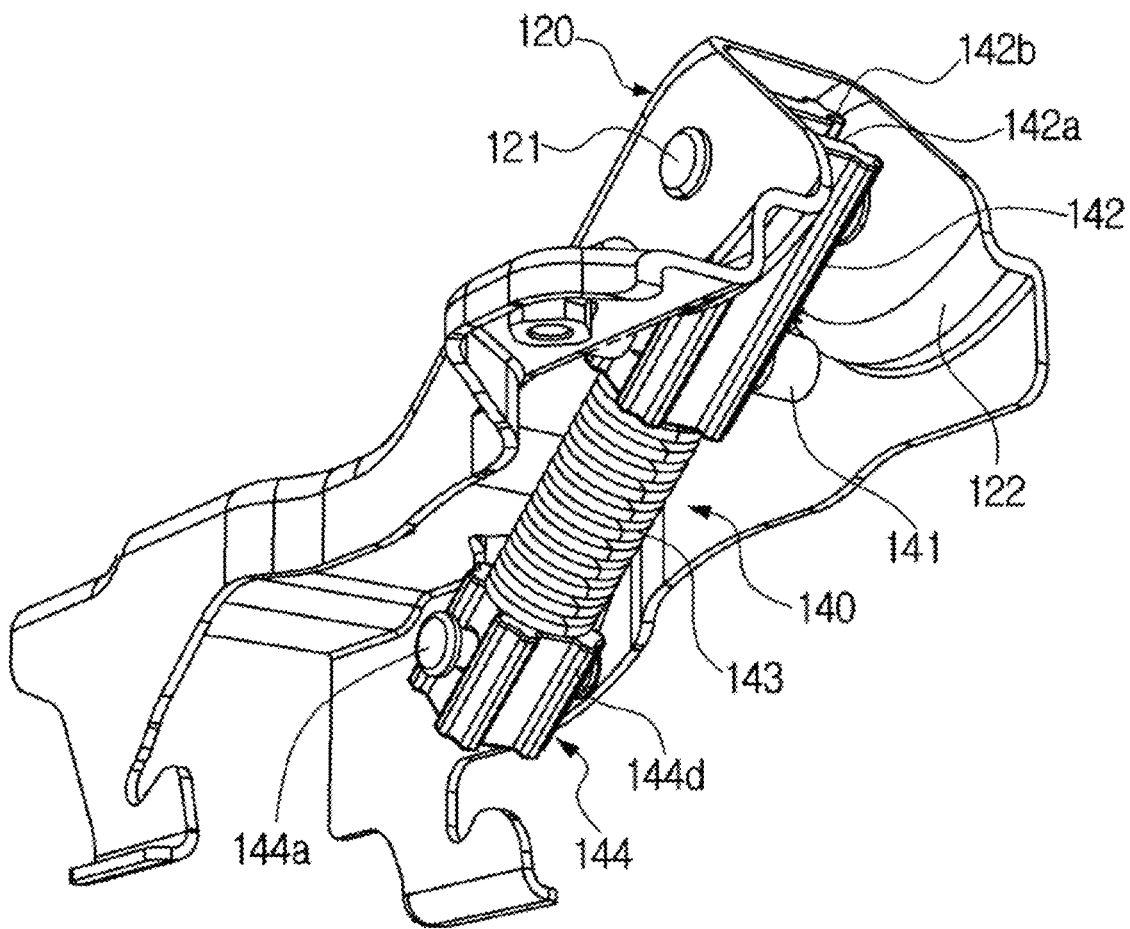
FIG. 4 is a schematic view showing a cushion assembly arranged inside a hinge arm, which is now removed from FIG. 2.
Figure 5:
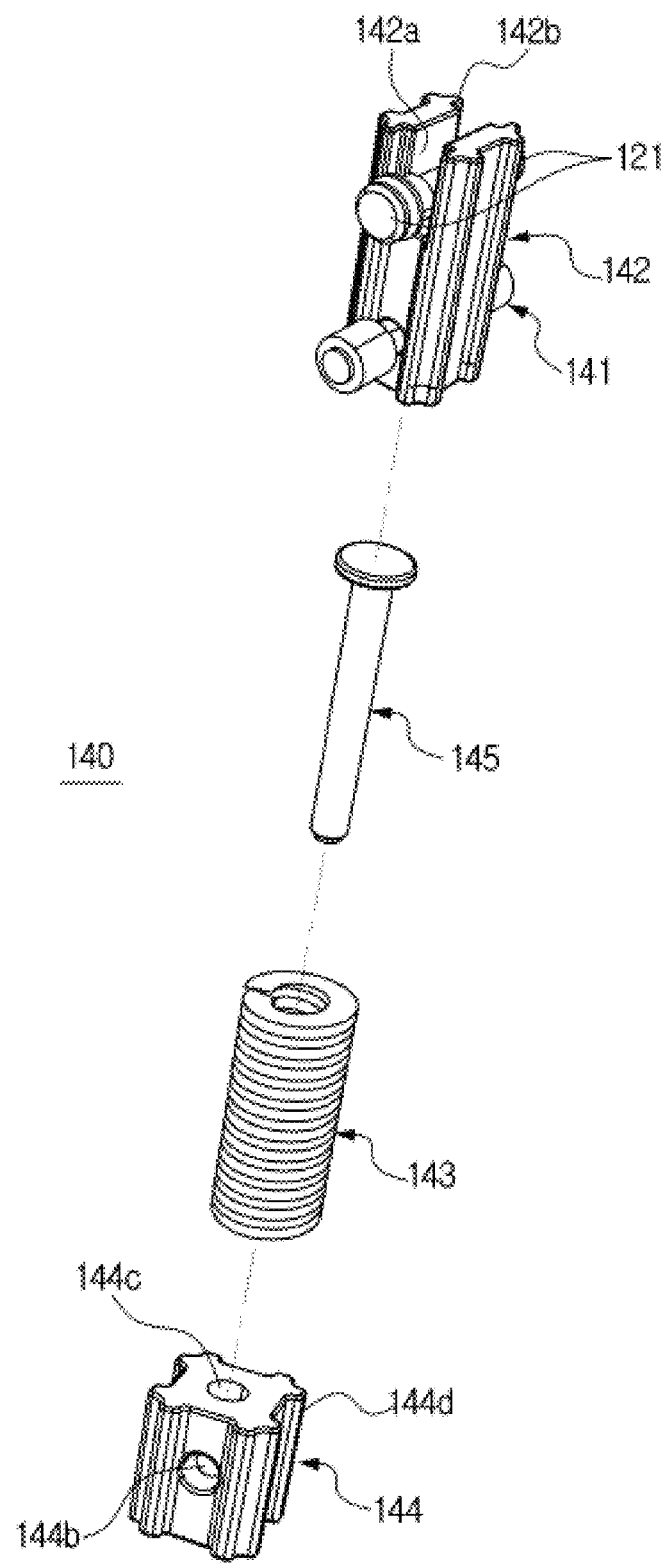
FIG. 5 is a schematic exploded view of the cushion assembly shown in FIG. 4.

FIG. 4 is a schematic view showing the cushion assembly arranged inside the hinge arm, which is now removed from FIG. 2. FIG. 5 is a schematic exploded view of the cushion assembly shown in FIG. 4.

Referring to FIGS. 4 and 5, the cushion assembly 140 may include a roller assembly 141 for making contact with the guide profile 122, a pin holder 142 for mounting and supporting the roller assembly 141, a damping spring 143 for elastically supporting the pin holder 142, a spring holder 144 for supporting the lower end of the damping spring 143, and a guide pin 145 for assisting in the deformation of the damping spring 143.

As a whole, when the roller assembly 141 is in contact with and pressed against the guide profile 122, the damping spring 143 elastically supports between the pin holder 142 and the spring holder 144.

Specifically, the roller assembly 141 may generally be mounted to the lower end portion of the pin holder 142.

Figure 6:
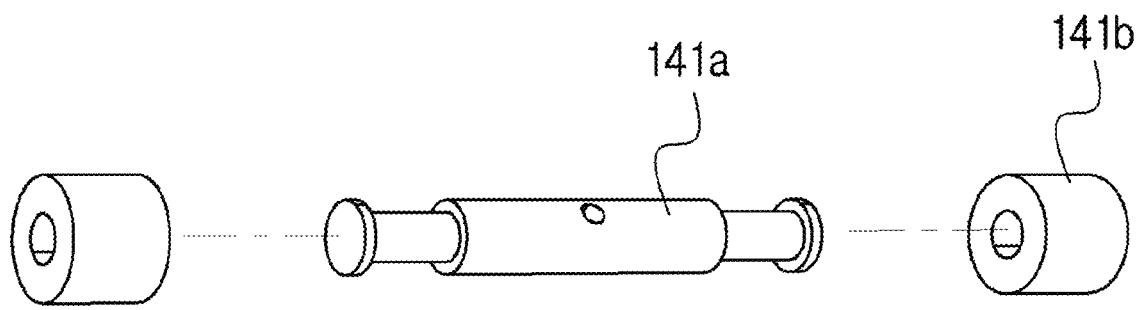
FIG. 6 is a schematic exploded view of the roller assembly shown in FIG. 4.

FIG. 6 is a schematic exploded view of the roller assembly shown in FIG. 4.

Referring to FIG. 6, the roller assembly 141 may be configured to include a shaft 141a extending to the left and right, and a roller 141b coupled to each end of the shaft 141a.

The shaft 141a is coupled to the pin holder 142 so as to pass through the pin holder 142 to the left and right, so that each end may be exposed to the outside of the pin holder 142.

The rollers 141b may be provided in a pair on the left and right sides of the shaft 141a. Each roller 141b may be rotatably coupled to each end of the shaft 141a. Further, each roller 141b may be arranged to be exposed to the outside of the pin holder 142, to thereby contact the guide profile 122 described above. The rollers 141b may make contact with and roll on the guide profile 122 according to the opening and closing of the trunk lid T.

The rollers 141b may be partially or entirely formed of an elastic material. This may prevent the slippage between the guide profile 122 and the rollers 141b from occurring, to thereby realize a smoother feeling of operation, and may also reduce the operating noise between the guide profile 122 and the rollers 141b. Therefore, the rollers 141b may be partially or entirely formed of an elastic material, including at least the contact surface with the guide profile 122.

Moreover, the diameter of the rollers 141b may be formed somewhat larger than the diameter of the shaft 141a. Such rollers 141b may also function as a kind of assembly structure that prevents the roller assembly 141 from being separated from the pin holder 142. Furthermore, the opening and closing assistance through rolling motion may be implemented more smoothly by appropriately increasing the diameter of the rollers 141b, and if an elastic material such as rubber is used, it is possible to contribute to some extent to securing the life of the roller 141b.

Referring back to FIGS. 4 and 5, the pin holder 142 may be formed to extend a predetermined length vertically, with the roller assembly 141 mounted at the lower end thereof. In general, the pin holder 142 may be formed in the form of a polygonal block extending vertically.

A guide groove 142a may be formed at the upper end of the pin holder 142. The guide groove 142a, in the form of the upper end opened, may be formed to extend a predetermined length from the upper surface of the pin holder 142 to the lower side.

The guide groove 142a may be coupled to the hinge shaft 121 described above. As the guide groove 142a is formed to extend a predetermined length vertically, the pin holder 142 may be moved vertically a predetermined range with respect to the hinge shaft 121. Here, the hinge shaft 121 may make contact with or be arranged adjacent to the inner wall of the guide groove 142a, to thereby guide the vertical movement of the pin holder 142. Therefore, the vertical movement of the pin holder 142 or the accompanying opening and closing assistance operation can be implemented more smoothly and stably, and damage or wear of parts from repetitive use can also be improved.

In addition, a plurality of first skid protrusions 142b may be formed on the side of the pin holder 142. The first skid protrusions 142b are a portion intended for making contact with and sliding on the inner wall of the hinge arm 110 inside the hinge arm 110, and may have a predetermined protrusion shape and may be formed to extend vertically on the side of the pin holder 142. The first skid protrusions 142b may be arranged in plurality spaced apart from each other along the side circumference of the pin holder 142.

Meanwhile, the damping spring 143 may elastically support between the pin holder 142 and the spring holder 144. The upper end of the damping spring 143 may elastically support the lower end of the pin holder 142, and the lower end of the damping spring 143 may elastically support the upper end of the spring holder 144. Accordingly, the damping spring 143 may elastically support the vertical movement of the pin holder 142 with respect to the spring holder 144.

In the case of the present embodiment, the damping spring 143 is illustrated as a compression coil spring. However, the damping spring 143 may be any means capable of providing elasticity against the compressive force, and is not necessarily limited to the illustrated compression coil spring. For example, the damping spring 143 may be implemented in a shape such as a plate spring other than a coil spring, and may also be configured as a means including a material or shape capable of performing a similar function to the spring.

Meanwhile, the spring holder 144 may be arranged spaced downward from the pin holder 142 by a predetermined distance with the damping spring 143 interposed therebetween.

The spring holder 144 may be fixedly installed at a predetermined position inside the hinge arm 110 by a holder pin 144a (see FIG. 2). The spring holder 144 may be provided with a holder pin fastening hole 144b for fastening the holder pin 144a.

In the case of the pin holder 142 described above, the position thereof varies according to the movement of the roller assembly 141, whereas the spring holder 144 is fixed in position inside the hinge arm 110 to thereby support the movement of the roller assembly 141 or the elastic force of the damping spring 143.

Further, the spring holder 144 may be provided with a guide pin fastening hole 144c. The guide pin fastening hole 144c is for fastening the guide pin 145, and may be formed to extend downward from the upper surface of the spring holder 144 to thereby penetrate the spring holder 144 vertically.

In addition, a plurality of second skid protrusions 144d may be formed around the side of the spring holder 144. The second skid protrusions 144d may be similar to the first skid protrusion 142b described above, may be intended to make contact with and slide on the inner wall of the hinge arm 110 inside the hinge arm 110, may have a predetermined protrusion shape, and may be formed to extend vertically on the side of the spring holder 144.

Meanwhile, the guide pin 145 may generally be formed in the shape of a bar extending vertically, and may be arranged to pass through the center of the damping spring 143 vertically.

The upper end of the guide pin 145 may be mounted and fixed to the pin holder 142, and the lower end of the guide pin 145 may be inserted and installed in the spring holder 144. Here, the lower end of the guide pin 145 may be inserted and installed in the guide pin fastening hole 144c, to thereby slide vertically inside the guide pin fastening hole 144c. In other words, the guide pin 145 may be formed to be movable vertically with respect to the spring holder 144.

The guide pin 145 as described above may assist the damping spring 143 in maintaining the assembled position between the pin holder 142 and the spring holder 144. In other words, the guide pin 145 may assist the damping spring 143 so as not to depart from the initial assembled position even when elastically deformed repetitively, and may effectively prevent the bending deformation of the damping spring 143.

Moreover, the guide pin 145 may further have a function of guiding the vertical movement of the pin holder 142 with respect to the spring holder 144. The pin holder 142 may move more stably and smoothly within the hinge arm 110 by having its movement assisted at the circumferential side by the first skid protrusions 142b and having its movement assisted again by the guide pin 145 at the center.

For reference, the cushion assembly 140 as described above may be assembled to the hinge arm 110 in the following order.

First, the spring holder 144 is inserted and assembled through the open portion of one end of the hinge arm 110, and then the damping spring 143 and the pin holder 142 are sequentially inserted and assembled. Here, the pin holder 142 may generally be arranged at the upper end portion of the moving hole 111b by the damping spring 143.

In the above state, the pin holder 142 is pressed by an operator or a predetermined assembly means, and the pin holder 142 is moved to the insertion hole 111a portion while compressing the damping spring 143. When the pin holder 142 is moved and arranged in this way, the roller assembly 141 is inserted and assembled through the insertion hole 111a. Further, when the pressing force is removed, the pin holder 142 may be raised by the damping spring 143 and the roller assembly 141 may be moved to the moving hole 111b portion, and the separation of the roller assembly 141 may be limited, thereby completing the assembly.

Meanwhile, as necessary, the hinge assembly 100 of the present embodiment may further include an auxiliary spring 150.

For convenience, the auxiliary spring 150 is conceptually and briefly shown in FIG. 1 for its coupled position and the like, and the illustration is omitted in other drawings.

Referring to FIG. 1, the auxiliary spring 150 may be sufficiently spaced from the hinge shaft 121, and may be mounted between the hinge bracket 120 and the hinge arm 110. In the present embodiment, the auxiliary spring 150 is illustrated as a tension coil spring, and accordingly, when the hinge arm 110 is rotated to the opened position, an elastic force in the opposite direction is applied to the hinge arm 110.

The auxiliary spring 150 as described above may be employed to realize a smoother feeling of operation in the vicinity of the final open position of the trunk lid T. Of course, in the hinge assembly 100 of the present embodiment, the impact at the opened position or the rotation speed may be primarily buffered by the damping spring 143 as in the operation process described below; however, by adding the auxiliary spring 150 for assisting this, a more stable and smoother feeling of operation is realized.

In particular, the auxiliary spring 150 may be appropriately added according to the weight of the trunk lid T, and so on, to thereby more easily respond to detailed application requirements, and contribute to the effect of cost reduction through standardization or mass production of the cushion assembly 140. In other words, the basic standards or performance of the cushion assembly 140 is unified for production efficiency, but an auxiliary spring 150 with appropriate performance is added according to detailed application requirements such as the weight of the trunk lid T, and so on. The auxiliary spring 150 is arranged at an exposed region between the hinge bracket 120 and the hinge arm 110, and thus has an aspect of easy such addition.

The operation of the hinge assembly 100 as described above is as follows.

Figure 7:
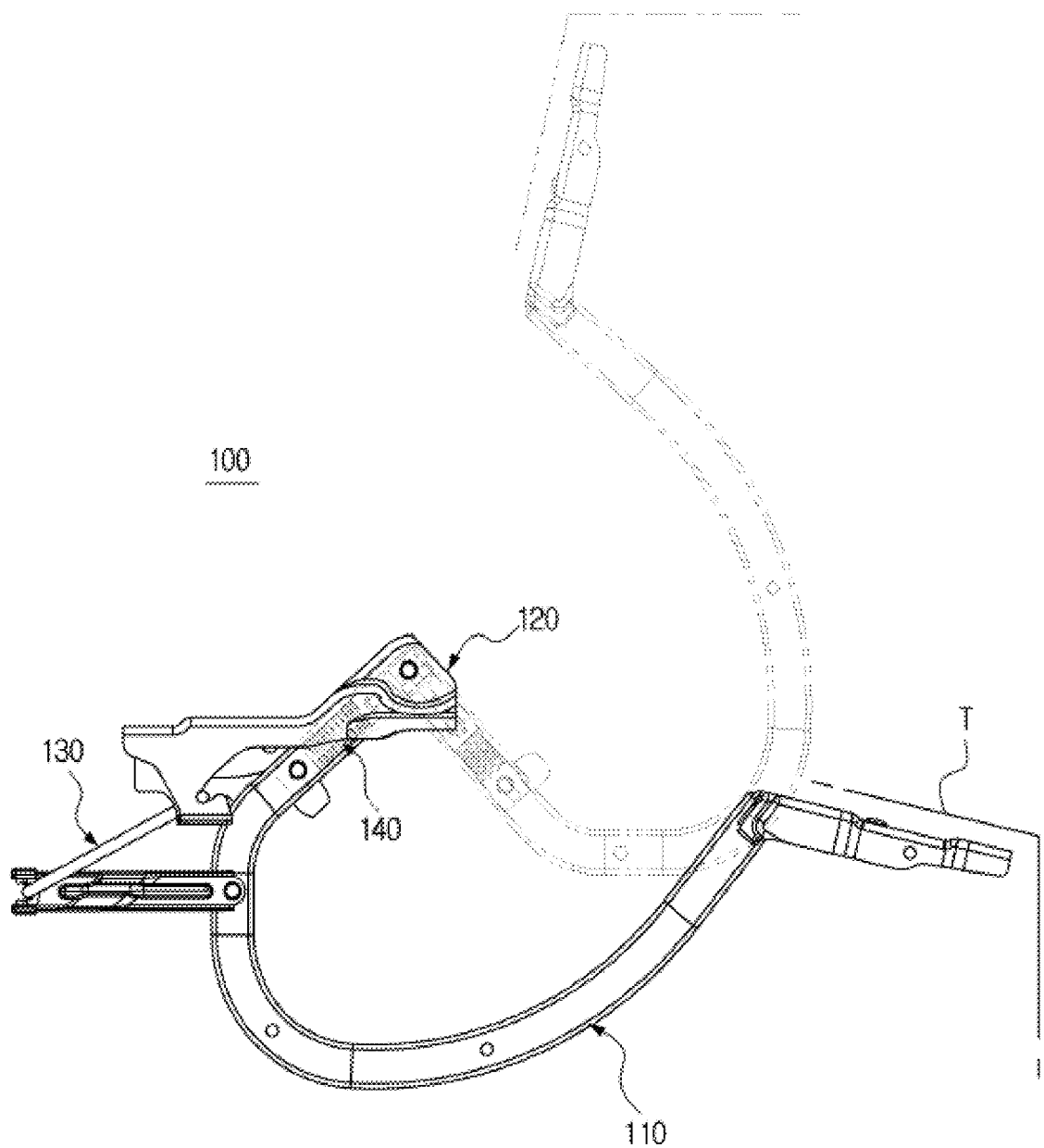
FIG. 7 is a diagram of operating states of the hinge assembly shown in FIG. 1.
Figure 8A:
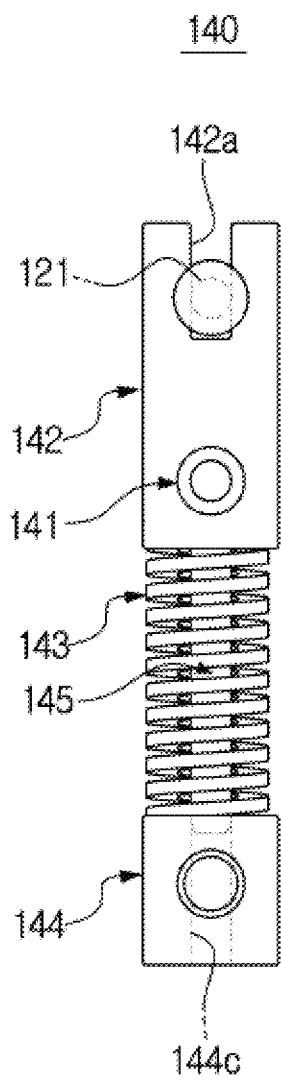
FIGS. 8A and 8B are schematic views showing the operation of the cushion assembly at each operating state of FIG. 7.
Figure 8B:
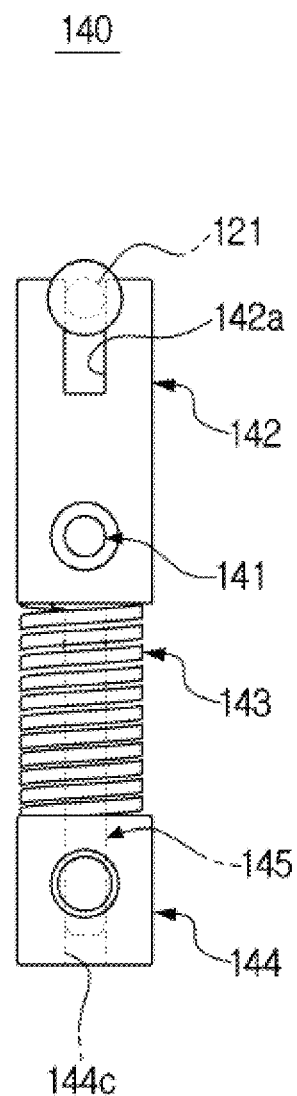

FIG. 7 is a diagram of operating states of the hinge assembly shown in FIG. 1. FIGS. 8A and 8B are schematic views showing the operation of the cushion assembly at each operating state of FIG. 7.

In FIG. 7, the part represented by solid lines shows a closed state, and the part represented by dotted lines shows an open state. FIG. 8A shows the operation of the cushion assembly in the closed state, and FIG. 8B shows the operation of the cushion assembly in the open state.

In the closed state, the roller assembly 141 may be located at the upper end portion of the pin guide hole 111, and may contact the closed position of the guide profile 122 (see R1 in FIG. 3) under the elastic force of the damping spring 143.

Meanwhile, the torsion bar 130 may elastically support the trunk lid T in the opening direction in the closed state, and the elastic force of the torsion bar 130 may be supported by a predetermined locking means such as a trunk latch or the like.

When the trunk lid T is opened from the closed state, the hinge arm 110 may be rotated in the opening direction about the hinge shaft 121. In other words, when the locking means such as the trunk latch or the like is released, the hinge arm 110 may be rotated by the elasticity of the torsion bar 130, to thereby cause the trunk lid T to open.

When the hinge arm 110 and the trunk lid T are rotated and opened as described above, the roller assembly 141 is gradually moved to the opened position (see R3 in FIG. 3) along the guide profile 122.

Here, since the guide profile 122 is formed such that the third radius R3 corresponding to the opened position is larger than the first radius R1 corresponding to the closed position, the roller assembly 141 is pushed out by the guide profile 122, to thereby compress the damping spring 143. Accordingly, the elastic force of the damping spring 143 and the rotation of the hinge arm 110 interact with each other, to thereby cause the opening (rotation) speed of the trunk lid T to decrease gradually. As a result, the trunk lid T can be opened with a smoother and more stable feeling of operation.

Meanwhile, the movement of the roller assembly 141 as described above may be carried out as the pin holder 142 is moved vertically inside the hinge arm 110. Here, the upper end of the pin holder 142 is coupled to the hinge shaft 121 through the guide groove 142a, and pin holder 142 is moved vertically while being supported by the hinge shaft 121.

In addition, the lower portion of the pin holder 142 may be guided for vertical movement by the guide pin 145. In other words, as the pin holder 142 is moved vertically, the guide pin 145 slidingly moves inside the guide pin fastening hole 144c, to thereby assist in the movement of the pin holder 142. Accordingly, the pin holder 142 can be stably moved vertically inside the hinge arm 110, despite the weight of the trunk lid T or the elasticity of the damping spring 143.

As described above, the hinge assembly 100 in accordance with the embodiments of the present inventive concept can assist in the opening and closing operation of the trunk lid T by the method of using the torsion bar 130 or the like. In particular, this can be implemented at a significantly lower cost compared to the conventional method of using a gas lift or the like, and can also have the effect of weight reduction by omitting parts.

In addition, the hinge assembly 100 in accordance with the embodiments of the present inventive concept can realize a smooth and stable feeling of operation through the guide profile 122, the cushion assembly 140, or the like, despite the cost reduction or weight reduction as described above. As a result, a safety incident resulting from the rapid opening of a trunk lid T, a problem of decreased emotional quality, or the like can be effectively resolved Although the embodiments of the present inventive concept have been described above, those having ordinary skill in the art to which the present inventive concept pertains will be able to variously modify and change the present inventive concept by adding, changing, removing, or incorporating constituent elements within the scope without departing from the spirit of the present inventive concept set forth in the claims, which is also intended to be included within the scope of the present inventive concept.

What is claimed is:

1. A hinge assembly for a trunk lid of a vehicle, comprising:
   a hinge arm (110) configured to be coupled to the trunk lid (T);
   a hinge bracket (120) configured to be coupled to a vehicle body and having a hinge shaft (121), the hinge arm (110) being rotatably coupled to the hinge bracket (120);
   a torsion bar (130) configured to be coupled to the hinge arm (110) and to provide an elastic force to the hinge arm (110) in an opening direction; and
   a cushion assembly (140) provided at one end of the hinge arm (110) adjacent to the hinge shaft (121) and configured to adjust a rotation speed of the hinge arm (110) in response to the elastic force of the torsion bar (130),
   wherein the cushion assembly (140) comprises:
   a pin holder (142) provided with a guide groove (142a) at an upper end thereof and arranged to be movable vertically inside the hinge arm (110);
   a roller assembly (141) spaced downward from the guide groove (142a) by a predetermined distance and configured to be coupled to the pin holder (142);

a spring holder (144) arranged spaced downward from the pin holder (142) by a predetermined distance and configured to be fixedly installed inside the hinge arm (110); and a damping spring (143) configured to elastically support between the pin holder (142) and the spring holder (144), wherein the guide groove (142*a*) is formed to extend a predetermined length downward from the upper end of the pin holder (142), is coupled to the hinge shaft (121), and is formed to guide a vertical movement of the pin holder (142) by the hinge shaft (121), wherein the cushion assembly (140) further comprises a guide pin (145) arranged to pass through a center of the damping spring (143), an upper end of the guide pin (145) being coupled to the pin holder (142) and a lower end thereof being coupled to the spring holder (144) so as to be slidingly movable vertically, and wherein the spring holder (144) has a guide pin retaining hole (144*c*) formed to extend vertically for the lower end of the guide pin (145) to be retained thereto.

2. The hinge assembly for a trunk lid of a vehicle according to claim 1, wherein the hinge bracket (120) has a guide profile (122) configured to be elastically contacted and supported by the cushion assembly (140) according to opening and closing of the trunk lid (T), wherein the guide profile (122) has a predetermined width so as to make surface contact with the roller assembly (141) and is formed to extend along a lower surface of the hinge bracket (120), and wherein the roller assembly (141) comprises:

a shaft (141*a*) fixedly coupled to the pin holder (142); and a roller (141*b*) rotatably coupled to each end of the shaft (141*a*), configured to make contact with and roll on the guide profile (122), and comprising an elastic material in part or entirely.

3. The hinge assembly for a trunk lid of a vehicle according to claim 2, further comprising:

an auxiliary spring (150) spaced from the hinge shaft (121) by a predetermined distance to thereby be fastened between the hinge bracket (120) and the hinge arm (110), the auxiliary spring (150) comprising a tension coil spring arranged to be exposed to the outside of the hinge bracket (120) and the hinge arm (110) and configured to apply a predetermined elastic force in an opposite direction when the hinge arm (110) rotates in an opening direction, wherein the guide profile (122) is formed to be spaced from the hinge shaft (121) by a first radius (R1) at a point corresponding to a closed position of the trunk lid (T), and is formed to be spaced from the hinge shaft (121) by a third radius (R3) at a point corresponding to an opened position of the trunk lid (T), and wherein the third radius (R3) is formed to be larger than the first radius (R1) by a predetermined amount.

* * * * *